(12) United States Patent
Thompson et al.

(10) Patent No.: US 7,505,951 B2
(45) Date of Patent: Mar. 17, 2009

(54) HIERARCHICAL STATE MACHINE GENERATION FOR INTERACTION MANAGEMENT USING GOAL SPECIFICATIONS

(75) Inventors: William K. Thompson, Evanston, IL (US); Paul C. Davis, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 322 days.

(21) Appl. No.: 11/420,995

(22) Filed: May 30, 2006

(65) Prior Publication Data

US 2007/0282593 A1 Dec. 6, 2007

(51) Int. Cl.
*G06F 17/00* (2006.01)
*G06N 5/00* (2006.01)

(52) U.S. Cl. ...................................................... 706/45
(58) Field of Classification Search .................. None
See application file for complete search history.

(56) References Cited

U.S. PATENT DOCUMENTS

| | | | |
|---|---|---|---|
| 4,068,298 A * | 1/1978 | Dechant et al. ............... 707/3 |
| 5,247,651 A | 9/1993 | Clarisse |
| 5,652,714 A | 7/1997 | Peterson |
| 5,694,558 A * | 12/1997 | Sparks et al. ............... 715/854 |
| 5,790,898 A | 8/1998 | Kishima et al. |
| 5,801,687 A | 9/1998 | Peterson et al. |
| 5,835,688 A | 11/1998 | Fromherz |
| 5,995,739 A | 11/1999 | Rotbart |
| 6,234,964 B1 * | 5/2001 | Iliff ............................ 600/300 |
| 6,324,496 B1 | 11/2001 | Alur et al. |
| 6,513,006 B2 | 1/2003 | Howard et al. |
| 6,735,592 B1 * | 5/2004 | Neumann et al. ............ 701/101 |
| 6,770,029 B2 * | 8/2004 | Iliff ............................ 600/300 |
| 6,778,651 B1 * | 8/2004 | Jost et al. ................. 379/201.01 |
| 6,829,603 B1 * | 12/2004 | Chai et al. ..................... 707/5 |
| 6,850,806 B2 * | 2/2005 | Yutkowitz ..................... 700/54 |
| 6,859,747 B2 * | 2/2005 | Yutkowitz .................... 702/105 |
| 6,865,499 B2 * | 3/2005 | Yutkowitz .................... 702/105 |
| 6,880,147 B1 * | 4/2005 | Pauly .......................... 717/104 |
| 6,914,975 B2 * | 7/2005 | Koehler et al. ........... 379/265.05 |
| 6,920,408 B2 * | 7/2005 | Yutkowitz .................... 702/105 |

(Continued)

FOREIGN PATENT DOCUMENTS

WO    WO9829817    9/1998

OTHER PUBLICATIONS

Tools for managing stories and questions Slator, B.M.; Tools with Artificial Intelligence, 1994. Proceedings., Sixth International Conference on Nov. 6-9, 1994 pp. 237-238 Digital Object Identifier 10.1109/TAI.1994.346486.*

(Continued)

*Primary Examiner*—Michael B. Holmes

(57) ABSTRACT

A Statechart is generated automatically from a set of goals for completion of a data model. A set of states is generated corresponding to completion states of the data model, an initial pseudo-state and a final state. Transitions are generated from the initial pseudo-state to an empty state of the set of states and between each state and its subset states. Outgoing transitions are generated from any state that satisfies at least one goal of the set of goals and a transition is generated from that state to the final state. The resulting Statechart may be used to manage an interactive dialog to complete a data model having a set of data fields.

4 Claims, 2 Drawing Sheets

U.S. PATENT DOCUMENTS

| | | | |
|---|---|---|---|
| 6,996,800 | B2 | 2/2006 | Lucassen et al. |
| 6,999,936 | B2* | 2/2006 | Sehr ............................ 705/5 |
| 7,010,472 | B1* | 3/2006 | Vasey-Glandon et al. ...... 703/6 |
| 7,020,850 | B2 | 3/2006 | Raghavan et al. |
| 7,024,368 | B1* | 4/2006 | Matheson .................... 704/275 |
| 7,167,550 | B2* | 1/2007 | Klos et al. ............. 379/201.01 |
| 7,197,460 | B1* | 3/2007 | Gupta et al. ............. 704/270.1 |
| 7,200,559 | B2* | 4/2007 | Wang ........................ 704/257 |
| 7,206,805 | B1 | 4/2007 | McLaughlin, Jr. |
| 7,213,230 | B2 | 5/2007 | Harel et al. |
| 7,225,125 | B2* | 5/2007 | Bennett et al. ............... 704/233 |
| 7,242,752 | B2* | 7/2007 | Chiu ....................... 379/88.04 |
| 7,272,586 | B2* | 9/2007 | Nauck et al. .................. 706/52 |
| 7,284,202 | B1* | 10/2007 | Zenith ........................ 715/744 |
| 7,286,985 | B2* | 10/2007 | Chiu .......................... 704/260 |
| 7,297,108 | B2* | 11/2007 | Iliff ........................... 600/300 |
| 7,337,158 | B2* | 2/2008 | Fratkina et al. ............... 706/45 |
| 7,401,040 | B2* | 7/2008 | Sloan et al. ............... 705/36 R |
| 7,406,418 | B2* | 7/2008 | Chiu .......................... 704/270 |
| 7,451,089 | B1* | 11/2008 | Gupta et al. ............. 704/270.1 |
| 7,460,650 | B2* | 12/2008 | Bushey et al. ............ 379/88.03 |
| 2002/0111965 | A1 | 8/2002 | Kutter |
| 2002/0167544 | A1 | 11/2002 | Raghavan et al. |
| 2002/0198719 | A1 | 12/2002 | Gergic et al. |
| 2003/0045281 | A1 | 3/2003 | Rimoni |
| 2003/0153998 | A1 | 8/2003 | Clifford |
| 2004/0003355 | A1 | 1/2004 | Denbraber |
| 2004/0085162 | A1 | 5/2004 | Agarwal et al. |
| 2005/0004786 | A1 | 1/2005 | Thomason |
| 2005/0086382 | A1 | 4/2005 | Ramaswamy et al. |
| 2005/0257051 | A1 | 11/2005 | Richard |
| 2006/0036770 | A1 | 2/2006 | Hosn et al. |
| 2006/0221081 | A1 | 10/2006 | Cohen et al. |
| 2007/0074184 | A1 | 3/2007 | Raghavan et al. |
| 2007/0282570 | A1 | 12/2007 | Thompson et al. |
| 2007/0282593 | A1 | 12/2007 | Thompson et al. |
| 2008/0046817 | A1 | 2/2008 | Sharp et al. |
| 2008/0071714 | A1 | 3/2008 | Menich et al. |

OTHER PUBLICATIONS

An expert system approach to designing and testing substation grounding grids Machias, A.V.; Dialynas, E.N.; Protopapas, C.A.; Power Delivery, IEEE Transactions on vol. 4, Issue 1, Jan. 1989 pp. 234-240 Digital Object Identifier 10.1109/61.19209.*

Case study: Digital's application generator Guerrieri, E.; Software, IEEE vol. 11, Issue 5, Sep. 1994 pp. 95-96 Digital Object Identifier 10.1109/52.311068.*

Designing interfaces for the organization Curtis, B.; Nielson, J.; Software, IEEE vol. 12, Issue 6, Nov. 1995 pp. 99-100 Digital Object Identifier 10.1109/52.469766.*

Interactive dialogue model: a design technique for multichannel applications Bolchini, D.; Paolini, P.; Multimedia, IEEE Transactions on vol. 8, Issue 3, Jun. 2006 pp. 529-541 Digital Object Identifier 10.1109/TMM.2006.870733.*

Formalizing Analytical Discourse in Visual Analytics Guoray Cai; Visual Analytics Science and Technology, 2007. VAST 2007. IEEE Symposium on Oct. 30, 2007-Nov. 1, 2007 pp. 217-218 Digital Object Identifier 10.1109/VAST.2007.4389025.*

A Prototyping and Simulation Approach to Interactive Computer System Design Hanau, P.R.; Lenorovitz, D.R.; Design Automation, 1980. 17th Conference on Jun, 23-25 1980 pp. 572-578.*

Analysis of Invariant Meta-features for Learning and Understanding Disable Peoples Emotional Behavior Related to Their Health Conditions: A Case Study Bourbakis, N.; Esposito, A.; Kavraki, D.; BioInformatics and BioEngineering, 2006 BIBE 2006. Sixth IEEE Symposium on Oct. 2006 pp. 357-369 Digital Object Identifier 10.1109/BIBE.2006.25330.*

Invited panel—engineering technology education in the era of globalization Yurtseven, H.O.; Richardson, C.; Sehi, G.H.; Hartin, J.R.; Thompson, S.A.; Frontiers in Education, 2005. FIE '05. Proceedings 35th Annual Conference Oct. 19-22 2005 pp.:F4B—1-3 Digital Object Identifier 10.1109/FIE.2005.1612129.*

User preferences for effective task completion while interacting with a robotic conversational animated face Ricano, Y.; Hernandez, J.; Sucar, L.E.; Mayora, O.; Robot and Human Interactive Communication, 2005. ROMAN 2005. IEEE International Workshop on Aug. 13-15, 2005 pp. 478-483 Digital Object Identifier 10.1109/ROMAN. 2005.1513825.*

Portability challenges in developing interactive dialogue systems Yuqing Gao; Liang Gu; Kuo, H.-K.J.; Acoustics, Speech, and Signal Processing, 2005. Proceedings. (ICASSP '05). IEEE International Conference on vol. 5, Mar. 18-23, 2005 pp.:v/1017-v/1020 vol. 5 Digital Object Identifier 10.1109/ICASSP.2005.1416479.*

The application of DLB algorithm in distributed speech dialogue system Heng Wang; Limin Du; Robotics, Intelligent Systems and Signal Processing, 2003. Proceedings. 2003 IEEE International Conference on vol. 2, Oct. 8-13, 2003 pp. 1273-1277 vol. 2 Digital Object Identifier 10.1109/RISSP.2003.1285775.*

Tools for managing stories and questions Slator, B.M.; Tools with Artificial Intelligence, 1994. Proceedings., Sixth International Conference on Nov. 6-9, 1994 pp. 237-238 Digital Object Identifier 10.1109/TAI.1994.346486.*

Interactive dialogue model: a design technique for multichannel applications Bolchini, D.; Paolini, P.; Multimedia, IEEE Transactions on vol. 8, Issue 3, Jun. 2006 pp. 529-541 Digital Object Identifier 10.1109/TMM.2006.870733.*

Interactive dialogue telephone service Stanimirovic, L.; Electrotechnical Conference, 2000. MELECON 2000. 10th Mediterranean vol. 2, 2000 pp. 516-518 vol. 2 Digital Object Identifier 10.1109/MELCON.2000.879983.*

A dialogue manager for efficient adaptive man-machine dialogues Ukelson, J.; Rodeh, M.; Computer Software and Applications Conference, 1989. COMPSAC 89., Proceedings of the 13th Annual International Sep. 20-22, 1989 pp. 588-595 Digital Object Identifier 10.1109/CMPSAC.1989.65152.*

A Prototyping and Simulation Approach to Interactive Computer System Design Hanau, P.R.; Lenorovitz, D.R.; Design Automation, 1980. 17th Conference on Jun. 23-25, 1980 pp. 572-578.*

Utterance promoting methods on speech dialog systems Nishi, H.; Kitai, M.; Interactive Voice Technology for Telecommunications Applications, 1994., Second IEEE Workshop on Sep. 26-27, 1994 pp. 109-112 Digital Object Identifier 10.1109/IVTTA.1994.341533.*

The application of DLB algorithm in distributed speech dialogue system Heng Wang; Limin Du; Robotics, Intelligent Systems and Signal Processing, 2003. Proceedings. 2003 IEEE International Conference on Volume 2, Oct. 8-13, 2003 pp. 1273-1277 vol. 2 Digital Object Identifier 10.1109/RISSP.2003.1285775.*

Cluster-based aprroacheies to the statistical modelling of dialogue data in the British National Corpus Hunter, G.J.A.; Huckvale, M.A.; Intelligent Environments, 2006. IE 06. 2nd IET International Conference on Volume 1, Jul. 5-6, 2006 pp. 229-238.*

James Allen, Donna Byron, Myroslava Dzikovska, George Ferguson, Lucian Galescu, and Amanda Stent, "Towards Conversational Human-Computer Interaction," AI Magazine, 2001.

David Harel, Statecharts: A Visual Formalism for Complex Systems, Sci. Comput. Programming, 8 (1987), 231-274.

State Chart XML (SCXML): State Machine Notation for Control Abstraction, W3C Working draft, http://www.w3.org/TR/scxml/ (Section 2), Jan. 24, 2006.

Voice Extensible Markup Language (VoiceXML) Version 2.0 W3C Recommendation Mar. 14, 2006, http://www.w3.org/TR/voicexml20/ (Section 1).

Xforms 1.0 (Second edition), W3C Recommendation Mar. 14, 2006, http://www.w3.org/TR/xforms/ (Section 2).

U.S. Appl. No. 10/421,012, filed May 30, 2006, Thompson et al.

U.S. Appl. No. 11/421,024, filed May 30, 2006, Thompson et al.

U.S. Appl. No. 11/611,288, filed Dec. 15, 2006, Davis et al.

Rudnicky, A. and Xu W. An agenda-based dialog management architecture for spoken language systems. IEEE Automatic Speech Recognition and Understanding Workshop, 1999, p. 1-337.

Constantinides, P., Hansma, S., Tchou, C. and Rudnicky, A. A schema-based approach to dialog control Proceedings of ICSLP. 1998, Paper 637.

William Thompson, Harry Bliss, A Declarative Framework for Building Compositional Dialog Modules, Sixth International Conference on Spoken Language Processing (ICSLP 2000), Beijing, China, Oct. 16-20, 2000.

Goddeau, D., Meng, H., Polifroni, J., Seneff, S., and Busayapongchai, S. (1996). A formbased dialogue manager for spoken language applications. In Proceedings of the International Conference on Spoken Language Processing, vol. 2, pp. 701-704, Philadelphia, Pa. IEEE.

Hardy, H., Strzalkowski, T., Wu, M., Dialogue management for automated multiingual call center ,Proceedings of the HLT-NAACL 2003 workshop on Research directions in dialogue processing—vol. 7 Edmonton, Alberta, Canada pp. 10-12 2003.

D. Harel and E. Gery, Executable Object Modeling with Statecharts, Computer 30:7 (Jul. 1997), IEEE Press, 31-42.

RJ Auburn, et al., State Chart XML (SCXML): State Machine Notation for Control Abstraction 1.0, W3C Working Draft, (Jul. 5, 2005), www.w3.oeg/TR/2005/WD-scxml-20050705, 1-54.

Auburn et al., "Voice Browser Call Control: CCXML Version 1.0," W3C Working draft, Jan. 19, 2007, http:w3.org/TR/ccxml/ (Sections 1 and 2) pp. 1-8.

Toptsis et al., "A Multi-Modal Dialog System for a Mobile Robot," accepted for Interspeech 2004 (ICSLP), 8th International Conference.

Giese et al., "Real-Time Statechart Semantics," Software Engineering Group, University of Paderborn, Germany, Jun. 2, 2003.

Duarte Nuno Jardin Nunes, "Object Modeling for User-Centered Development and User Interface Design: The Wisdom Approach," Universidade da Madeira, Funchal - Portugal, Apr. 2001.

French et al., "Generating User Interface from Composite Schemas," Proceedings of XML, 2003.

\* cited by examiner

HIERARCHICAL STATE MACHINE GENERATION FOR INTERACTION MANAGEMENT USING GOAL SPECIFICATIONS

CROSS REFERENCE TO RELATED APPLICATIONS

This application is related to co-pending U.S. patent applications with docket numbers CML03561HI titled "Statechart Generation Using Frames" and CML03562HI titled "Frame Goals for Dialog System" that are filed even date with this application.

BACKGROUND

Finite State Machines (FSMs) have frequently been used as a technique for specifying dialog flows. FSMs consist of a set of system states along with a set of labeled transitions (arcs between states) which define how to move from one state to another. In recent years, it has become increasingly popular in certain areas to use extensions to FSMs known as Harel Statecharts (Statecharts), or Hierarchical State Machines (HSMs). This is primarily due to their inclusion in the UML 2.0 standard, although they have also found uses in other areas, such as the design of human-computer interaction control logic. Statecharts are similar in many respects to FSMs, but they are augmented with a variety of additional constructs, including hierarchical states, guard conditions, actions on transitions, parallel states and broadcast communication. These generalizations, while not mathematically increasing the expressive power of Statecharts with respect to FSMs, can greatly reduce the representational complexity of a given state machine specification when compared with a behaviorally equivalent FSM. Statecharts are therefore better suited than FSMs for modeling complex reactive systems, of which user interfaces are prime examples. Despite these advantages over FSMs, it remains the case that designing a Statechart for specifying a dialog flow can be a very complex task, especially at the very initial stages of dialog design. The dialog designer must still determine the relevant set of states and transitions, which actions must be executed, and in what order. Anything that can help automate this process, especially at the initial stages, would make this process less difficult and error prone.

Statecharts are known in the art, and have been used with dialog systems and as starting points for software generation. However, these statecharts have not been developed automatically from higher-level descriptions or using goal specifications. A Statechart may be represented in graphical form, in a statechart diagram, or by a textual language, such as the State Chart eXtensible Markup Language (SCXML), that specifies user interaction control logic. It may also be represented directly in code. Our invention covers all of these possibilities.

Feature models have been used to generate deterministic Statecharts. However, features models are quite different from goals specified over a data model, and are more like domain models rather than compact descriptions of desired states of affairs.

Declarative constructs (other than goals) have been used to generate simple state machines, but not for the generation of Statecharts.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
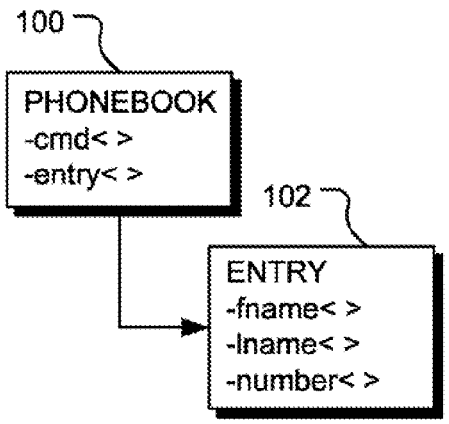
FIG. 1 is a diagram of an exemplary data structure of a data model.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

During the initial stages of the design of a Statechart for an application, such as a dialog application, it is helpful to generate at least part of a Statechart from an a priori representation of the application tasks and goals for which the dialog is being designed. In one embodiment of the invention, a Statechart is generated automatically from a set of goals, specified over a (possibly nested) data structure representing the information that the interaction manager must acquire in a dialog with a user. This data structure is referred to as the 'data model'.

Figure 2:
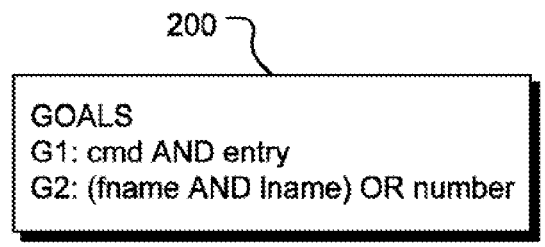
FIG. 2 is a diagram of exemplary goals relating to the completion of a data model, consistent with certain embodiments of the invention.

An exemplary data model is shown in FIG. 1. In this example, the data model comprises a top-level phonebook structure 100 that contains a nested phonebook entry structure 102. Each phonebook includes an entry field (entry), and a command field (cmd), which can take on values such as 'lookup', 'add', or 'delete'. An entry is a nested structure that includes a first name field (fname), last name field (lname) and a telephone number field (number). Exemplary goals specified over this data model are shown in FIG. 2. The first goal (G1) applies to the top-level phonebook structure, and specifies that the command field (cmd) and the entry field (entry) in the phonebook structure have both been filled by a legal value or combination of legal values. The second goal (G2) is specified over the embedded phonebook entry structure, and specifies that both the first and last name fields have been filled, or that the telephone number field has been filled. In general, we represent goals as Boolean expressions over fields. In this example, goals are represented in Disjunctive Normal Form, i.e., disjunctions of conjunctions of predicates over fields.

Figure 3:
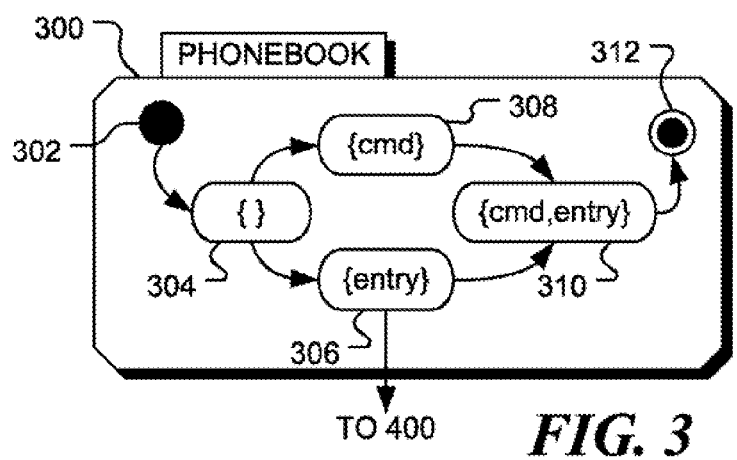
FIG. 3 is an exemplary Statechart, consistent with certain embodiments of the invention.
Figure 4:
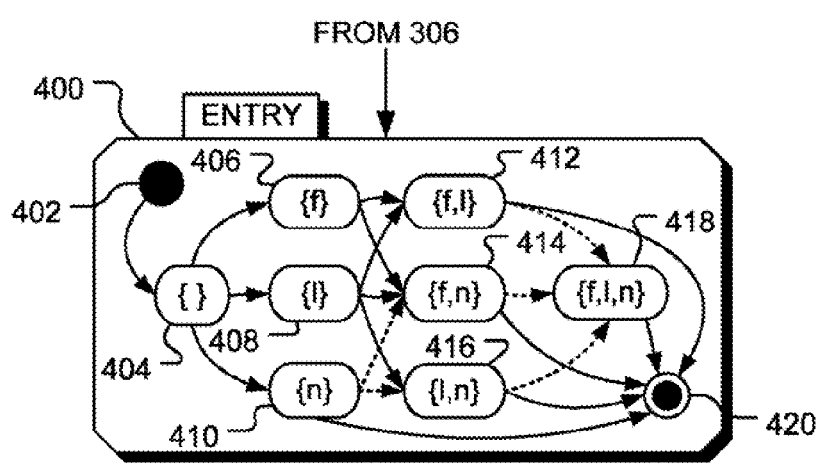
FIG. 4 is an exemplary embedded Statechart, consistent with certain embodiments of the invention.

A Statechart can be generated from the data model. The resulting Statechart contains a set of states, each representing a state of completion of the associated data model. The term 'completion' is taken to include full completion (all fields filled) and partial completion (some fields filled) as well as no completion (no field filled). The Statechart corresponding to the top-level 'phonebook' data structure is shown in FIG. 3 and the Statechart for the embedded 'entry' data structure is shown in FIG. 4. On completion, the generation technique produces a single Statechart for a given data model and includes the embedded Statechart. The Statecharts in FIG. 3 and FIG. 4 are composed into a single Statechart and the Statechart in FIG. 4 is nested inside the {entry} state 306 in FIG. 3. Referring to FIG. 3, the phonebook Statechart 300 includes an initial pseudo-state 302, a state 304 corresponding to the empty set, states 306 and 308 for which a single field of the data model is filled, a state 310 for which both fields of the data model are filled and a final state 312. Each transition in the Statechart, denoted by an arrow connecting two states, represents a change in the state of the associated data model. Referring to FIG. 4, the entry Statechart 400 includes an initial pseudo-state 402, a state 404 corresponding to the empty set, states 406, 408 and 410 for which a single field of the data model is filled, states 412, 414 and 416 for which two fields of the data model are filled, state 418 for which all fields are filled, and a final state 420. In FIG. 4, the letter 'l' is used to denote the last name field (lname), the letter 'f' is used to denote the first name field (fname), the letter 'n' is used to denote the number field (number).

Goal information is used by the Statechart generator for two purposes. First, the Statechart uses the goal information in order to determine when a Statechart is completed—if the associated data structure satisfies a goal specification, the Statechart state representing this goal state will automatically transition to a designated final state in the Statechart. Referring to FIG. 3, when state 310 is entered, the goal G1 is satisfied and the Statechart transitions to the final state 312. Similarly, referring to FIG. 4, when state 412, state 414 or state 410 is entered, the goal G2 is satisfied and the Statechart transitions to the final state 420. Second, when the system has initiative in an ongoing dialog, the goal information will be used to generate appropriate transitions to a state where the system presents to the user the next topic of discussion. Referring to FIG. 3, when state 308 is reached the system can prompt the user to specify a phonebook entry, since this is what is required to reach the goal G1. Similarly, referring to FIG. 4, when state 406 is reached, the system will prompt the user to specify a last name or a phone number, since this is what is required to reach the goal G2.

Figure 5:
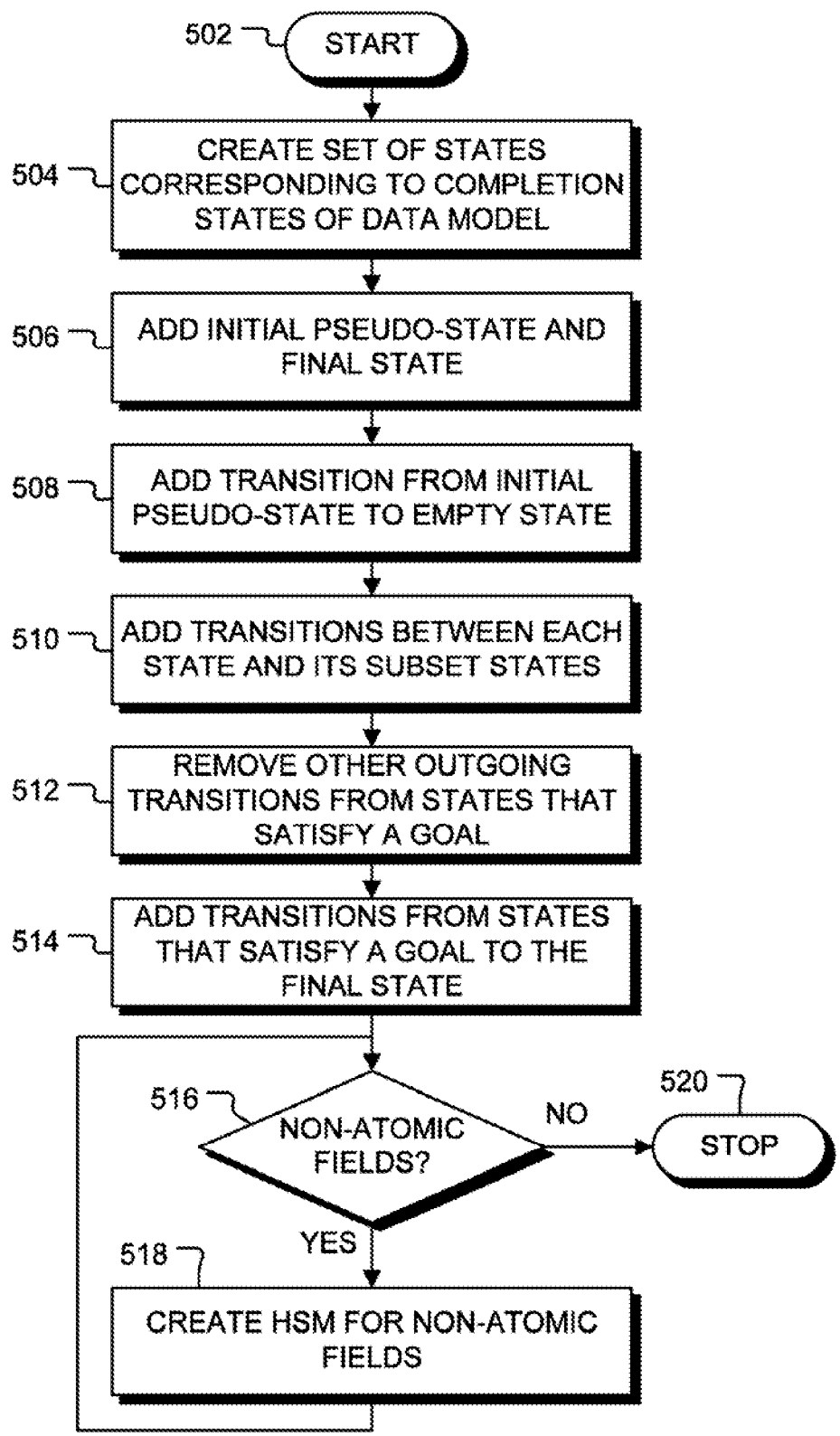
FIG. 5 is a flow chart of a method for Statechart generation, consistent with certain embodiments of the invention.

FIG. 5 is a flow chart of a method for generating a Statechart from a set of goals specified over a data model, consistent with certain embodiments of the invention. Referring to FIG. 5, the process begins start block 502 when a set of goals (in Disjunctive Normal Form) is specified over a data model which has n fields, where each field $f_i$ is associated with a constraint store $C_i$ that contains the current set of possible legal values for the field $f_i$.

In one embodiment, the general procedure for using the data model plus goals to generate a Statechart is as follows. A data model can be viewed as a tree structure, with each nested structure being a node of this tree. For each node $n_i$ of a data model tree, all the field names of $n_i$ are collected into a set $F_i$. For the data model shown in FIG. 1, this yields two sets, $F_1$ and $F_2$, corresponding to the top-level structure and the single nested structure ($F_1$={cmd, entry}, and $F_2$={fname, lname, number}). For each $F_i$ a set of states for a Statechart $S_i$ is created. At the end of the process, the generated Statecharts will be linked together in a single Statechart by embedding all non-root level Statecharts inside of higher-level states. For example, 400 will be embedded in the entry state 306 in 300. This procedure therefore takes advantage of the hierarchical structure permitted by Statecharts.

For the rest of this procedure, the generation of a Statechart from a single node of the data model tree is described. This procedure is repeated for each node of the data model tree, and the generated Statecharts are linked together afterwards as described above.

At block 504 of FIG. 5, we take the set F of fields (at a given node in the data model) and generate the power set of F, denoted by: PowerSet(F). This set contains all of the subsets of F, and is of cardinality $2^n$, where n is the cardinality of F. Each of these subsets represents a state of completion of the associated data model—every member of the subset represents a field in the data model that is satisfied, or filled by legal value. For each of the members of the PowerSet(F), a state of a Statechart labeled by this subset is generated. These form the core states of the Statechart associated with the node in the data model. For example, states 304, 306, 308 and 310 are generated in FIG. 3. At block 506, an initial pseudo-state (302 in FIG. 3, for example) is added together with a final state (312 in FIG. 3, for example) for a total of $2^n+2$ states.

In the worst case, the procedure described above for generating Statechart states from a data model produces a Statechart exponentially larger than the data model from which it is generated. There are two ways in which this exponential blow-up can be mitigated. First, by hierarchically structuring the data model, as shown in FIG. 1, the fields are partitioned into smaller sets which are independent of each other. This partitioning will reduce the resulting set of states from $2^n$ to $p(2^{n/p})$, where p is the number of partitions. Second, it is also possible to partition the fields in a single node of the data model into non-overlapping subsets. This is the case if the dialog designer decides that the fields in the data structure do not interact with each other in the course of a dialog. For example, if each field represents a choice in a menu, where each choice excludes all others, we can partition F into n subsets, one for each field. Then the union of the power set of each partition $P_i$ of F can be taken as the set of labels for the Statechart associated with F. In the menu example described above, this would produce a set of states of size n+1 (one for each field, plus the empty state), rather than $2^n$. In general, the same reduction in state space size is achieved as with the partitioning due to hierarchical decomposition of the data model.

Next, the transitions, between the states previously generated, are generated. At block 508 a transition is added from the initial state to the state s labeled with the empty set. At block 510, a transition is created from states $s_1$ to $s_2$ for each pair of states $s_1$ to $s_2$ for which $s_1$ is labeled with a subset of the label of $s_2$. At block 512, all outgoing transitions are removed from any state s that satisfies a goal g. In FIG. 4, for example, the transitions shown with the broken lines are removed, leaving only transitions shown by solid lines.

At block 514, transitions to the final state are added from any state s that satisfies a goal g. In FIG. 4, for example, states 410, 412, 414 and 418 satisfy goal G2, so transitions are added from these states to the final state 420. At decision block 516, a check is made to determine if the Statechart contains any non-atomic fields, containing an embedded node in the data model tree. If a field f is non-atomic, as depicted by the positive branch from decision block 516, an embedded Statechart for the field is generated according to the above. For example, the 'entry' field in the phonebook data model 100 is non-atomic, so the Statechart 400 shown in FIG. 4 is generated as an embedded Statechart. This process continues recursively until, as depicted by the negative branch from decision block 516, embedded Statecharts have been generated for all of the non-atomic fields and the process terminates at block 520.

The resulting Statechart represents directly the progress towards satisfying the goals specified over the data model.

During the execution of the Statechart, a goal atom referring to field f is satisfied if the constraint store C associated with f constrains the value off to a single legitimate value.

Constraint stores may be used, rather than referring to fields directly, to facilitate the use of field constraints that restrict their possible values, without necessarily satisfying the associated goals. For example, if an automatic speech recognition engine returns three possible n-best values for the same field, these can be placed in the field's constraint store as a disjunction of possible values, only one of which will prove to be the correct one. Another use for constraint stores is for handling ambiguity. For example, if a phone book lookup for a first name of "Steve" results in multiple possible last names (e.g., "Nowlan" and "Albrecht"), these possible last name values will be stored as a disjunction of possible names in the last name constraint store. Yet another possible use for constraint stores is the use of negated values. A negated value in a constraint store can indicate a value which the associated field cannot acquire. Such a value could be removed from an active grammar in order to improve automatic speech recognition (the constraint store then contains a "skip-list").

The automatically generated Statechart can be iteratively modified by the designer, which is a much easier task that starting a new Statechart from scratch.

The present invention, as described in embodiments herein, may be implemented using a programmed processor executing programming instructions that are broadly described above in flow chart form that can be stored on any suitable storage medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for managing an interactive dialog with a user, the method comprising:
generating a Statechart from a plurality of goals, the generating comprising:
generating a set of states corresponding to completion states of a data model comprising a set of data fields;
generating an initial pseudo-state and a final state;
generating a transition from the initial pseudo-state to an empty state of the set of states;
generating transitions between pairs of states of the set of states;
removing outgoing transitions from any state of the set of states that satisfies at least one of the goals; and
generating transitions to the final state from any state of the set of states that satisfies at least one of the goals; and
conducting the interactive dialog with the user in an attempt to complete the data model, the conducting comprising using the Statechart to manage the interactive dialog.

2. A method in accordance with claim 1 wherein generating a Statechart further comprises repeating the elements:
generating an embedded Statechart for any non-atomic state in the set of states; and
adding states of the embedded Statechart to the set of states, until Statecharts have been generated for all non-atomic states in the set of states.

3. A method in accordance with claim 1, further comprising providing the Statechart to a designer for modification.

4. A computer-readable medium containing instructions for a method for managing an interactive dialog with a user, the method comprising:
generating a Statechart from a plurality of goals, the generating comprising:
generating a set of states corresponding to completion states of a data model comprising a set of data fields;
generating an initial pseudo-state and a final state;
generating a transition from the initial pseudo-state to an empty state of the set of states;
generating transitions between pairs of states of the set of states;
removing outgoing transitions from any state of the set of states that satisfies at least one of the goals; and
generating transitions to the final state from any state of the set of states that satisfies at least one of the goals; and
conducting the interactive dialog with the user in an attempt to complete the data model, the conducting comprising using the Statechart to manage the interactive dialog.

* * * * *